United States Patent
Crombez

(10) Patent No.: US 10,150,461 B2
(45) Date of Patent: Dec. 11, 2018

(54) METHOD AND ASSEMBLY FOR POWERTRAIN BRAKING AND FRICTION BRAKING A VEHICLE

(71) Applicant: FORD GLOBAL TECHNOLOGIES, LLC, Dearborn, MI (US)

(72) Inventor: Dale Scott Crombez, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 303 days.

(21) Appl. No.: 15/183,135

(22) Filed: Jun. 15, 2016

(65) Prior Publication Data

US 2017/0361827 A1 Dec. 21, 2017

(51) Int. Cl.
| | |
|---|---|
| B60W 20/14 | (2016.01) |
| B60W 20/00 | (2016.01) |
| B60K 6/48 | (2007.10) |
| B60W 10/04 | (2006.01) |
| B60W 10/18 | (2012.01) |
| B60W 10/08 | (2006.01) |
| B60W 10/184 | (2012.01) |
| B60W 30/18 | (2012.01) |

(52) U.S. Cl.
CPC .............. *B60W 20/00* (2013.01); *B60K 6/48* (2013.01); *B60W 10/04* (2013.01); *B60W 10/08* (2013.01); *B60W 10/18* (2013.01); *B60W 10/184* (2013.01); *B60W 30/18127* (2013.01); *B60T 2270/604* (2013.01); *B60T 2270/611* (2013.01); *B60W 2540/10* (2013.01); *B60W 2710/06* (2013.01); *B60W 2710/08* (2013.01); *B60W 2710/083* (2013.01); *B60W 2710/182* (2013.01)

(58) Field of Classification Search
None
See application file for complete search history.

(56) References Cited

U.S. PATENT DOCUMENTS

| | | | |
|---|---|---|---|
| 6,378,636 B1 * | 4/2002 | Worrel | B60K 6/48 |
| | | | 180/65.25 |
| 7,295,918 B2 | 11/2007 | Nada | |
| 2002/0163251 A1 | 11/2002 | Crombez et al. | |
| 2011/0160974 A1 * | 6/2011 | Fukuda | B60T 7/12 |
| | | | 701/70 |
| 2015/0019058 A1 | 1/2015 | Georgiev | |
| 2016/0082842 A1 | 3/2016 | Perkins | |
| 2017/0015203 A1 * | 1/2017 | Oguri | B60L 7/18 |

* cited by examiner

*Primary Examiner* — Rami Khatib
*Assistant Examiner* — Gerrad A Foster
(74) *Attorney, Agent, or Firm* — Carlson, Gaskey & Olds, P.C.

(57) ABSTRACT

An exemplary method includes applying both friction braking and powertrain braking when decelerating a vehicle to a stop, the applying in response to a driver lifting off an accelerator pedal. An exemplary assembly includes a powertrain brake, a friction brake, and a braking controller configured to command the powertrain brake to apply powertrain braking and the friction brake to apply friction braking to stop a vehicle in response to a driver lifting off an accelerator pedal.

12 Claims, 2 Drawing Sheets

METHOD AND ASSEMBLY FOR POWERTRAIN BRAKING AND FRICTION BRAKING A VEHICLE

TECHNICAL FIELD

This disclosure relates generally to braking a vehicle and, more particularly, to braking using a combination of powertrain braking and friction braking without a driver interacting with a brake pedal.

BACKGROUND

Braking can decelerate a moving vehicle to a stop. Friction braking decelerates the vehicle by resisting movement using friction brakes. Powertrain braking decelerates the vehicle by resisting movement using an engine, an electric machine, or both.

Some vehicles use powertrain braking to decelerate a moving vehicle as a driver lifts off of an accelerator pedal. Although slowed by the powertrain braking, the vehicle can continue to move even though the driver has lifted off of the accelerator pedal. The movement, or creep, will continue until the driver presses a brake pedal, which causes the vehicle to apply friction brakes to bring the vehicle to a stop.

Some electrified vehicles include functionality that can decelerate a moving vehicle to a stop when a driver lifts off of an accelerator pedal. These electrified vehicles decelerate the moving vehicle with powertrain braking using an electric machine. If a battery of these electrified vehicles cannot store energy generated by the electric machine during powertrain braking, the electrified vehicle suspends this functionality.

SUMMARY

A method according to an exemplary aspect of the present disclosure includes, among other things, applying both friction braking and powertrain braking when decelerating a vehicle to a stop. The applying is in response to a driver lifting off an accelerator pedal.

A further non-limiting embodiment of the foregoing method includes applying the friction braking without actuating brake pedal.

A further non-limiting embodiment of any of the foregoing methods includes, during the applying, decreasing the powertrain braking and compensating for the decreasing by increasing the friction braking.

In a further non-limiting embodiment of any of the foregoing methods, a rate of the decreasing of the powertrain braking is the same as a rate of the increasing of the friction braking.

A further non-limiting embodiment of any of the foregoing methods includes, during the applying, ramping out deceleration due to the powertrain braking at a first rate and ramping in deceleration due to the friction braking at a second rate proportional to the first rate.

In a further non-limiting embodiment of any of the foregoing methods, the friction braking is autonomous friction braking.

In a further non-limiting embodiment of any of the foregoing methods, the stop is a complete stop.

In a further non-limiting embodiment of any of the foregoing methods, the stop is on a road grade that is no more than 33%.

In a further non-limiting embodiment of any of the foregoing methods, the vehicle is an electrified vehicle.

An assembly according to another exemplary aspect of the present disclosure includes, among other things, a powertrain brake, a friction brake, and a braking controller. The braking controller is configured to command the powertrain brake to apply powertrain braking and the friction brake to apply friction braking to stop a vehicle in response to a driver lifting off an accelerator pedal.

In a further non-limiting embodiment of the foregoing assembly, the powertrain brake is an internal combustion engine.

In a further non-limiting embodiment of the foregoing assembly, the powertrain brake is an electric machine.

In a further non-limiting embodiment of any of the foregoing assemblies, the vehicle is an electrified vehicle.

In a further non-limiting embodiment of any of the foregoing assemblies, the powertrain braking and friction braking bring the vehicle to a complete stop.

In a further non-limiting embodiment of any of the foregoing assemblies, the powertrain braking and friction braking bring the vehicle to a complete stop on a road grade that does not exceed 33%.

A further non-limiting embodiment of any of the foregoing assemblies includes a brake pedal. The controller is configured to command the friction brake to apply friction braking without a driver interacting with a brake pedal when the driver lifts off the accelerator pedal.

In a further non-limiting embodiment of any of the foregoing assemblies, the controller, in response to the driver lifting off the accelerator pedal, is configured to command the powertrain braking to decrease and to command the friction braking to increase to compensate for the decrease in the powertrain braking.

In a further non-limiting embodiment of any of the foregoing assemblies, the controller is configured to command the powertrain braking to decrease and a first rate and to command the friction braking to increase at a second rate that is the same as the first rate.

In a further non-limiting embodiment of any of the foregoing assemblies, the controller, in response to the driver lifting off the accelerator pedal, is configured to command powertrain braking to ramp out deceleration due to powertrain braking a first rate and to command friction braking to ramp in deceleration due to the friction braking at a second rate proportional to the first rate.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Friction braking, powertrain braking, or both can decelerate a vehicle. This disclosure relates to using both friction braking and powertrain braking to bring a vehicle to a complete stop without requiring a driver to interact with a brake pedal.

Figure 1:
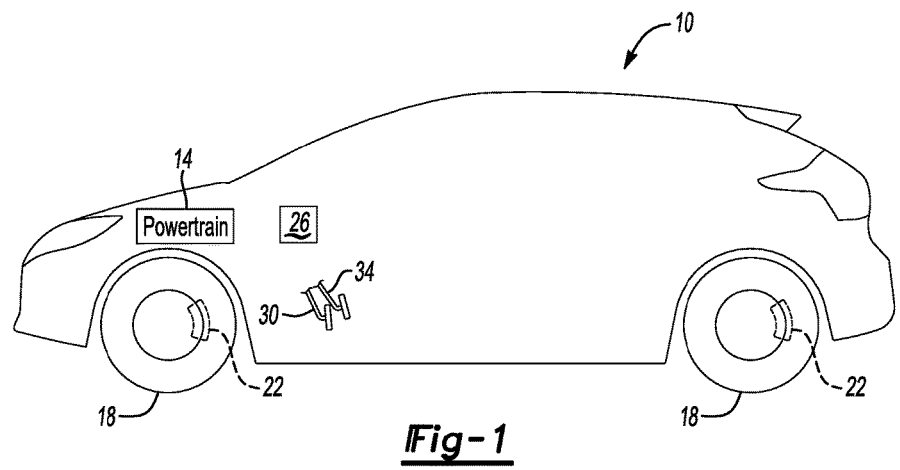
FIG. 1 illustrates a partially schematic view of an example vehicle.
Figure 2:
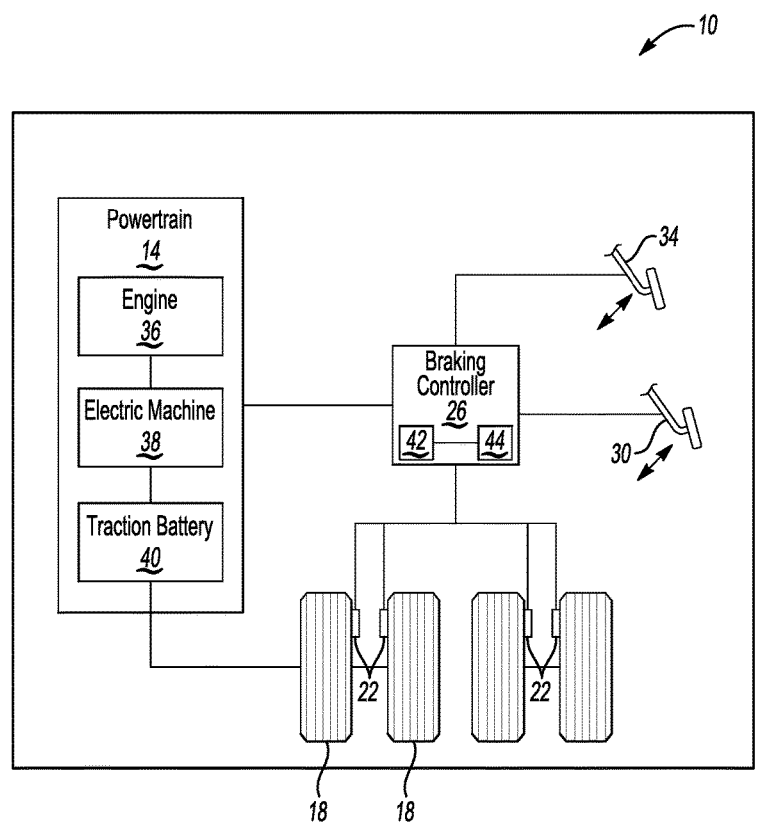
FIG. 2 illustrates a highly schematic view of the vehicle of FIG. 1.

Referring to FIGS. 1 and 2, an example vehicle 10 includes a powertrain 14, a plurality of wheels 18, a plurality of friction brakes 22, at least one braking controller 26, an accelerator pedal 30, and a brake pedal 34. At least one of the friction brakes 22 is associated with each of the wheels 18.

The example powertrain 14 includes, but is not limited to, an internal combustion engine 36, an electric machine 38, and a traction battery 40.

The example vehicle 10 is an electrified vehicle that is selectively driven using torque provided by the electric machine 38. The traction battery 40 provides power to drive the electric machine 38. The electric machine 38 can be utilized as a generator to recharge the traction battery 40 under some operating conditions, such as during regenerative braking. The electric machine 38 can drive the vehicle 10 instead of, or in addition to, the engine 36.

Example electrified vehicles can include hybrid electric vehicles (HEVs), plug-in hybrid electric vehicles (PHEVs), fuel cell vehicles (FCVs), and battery electric vehicles (BEVs).

Although described in connection with the electrified vehicle 10, the teachings of this disclosure could be applied other vehicles, including conventional vehicles lacking an electric machine and traction battery. Conventional vehicles, in contrast to electrified vehicles, are driven exclusively using torque provided by an internal combustion engine.

In the example vehicle 10, the powertrain can apply powertrain braking to decelerate the vehicle 10. Powertrain braking resists movements of the wheels 18, which decelerates the wheels and thus the vehicle 10. The electric machine 38 and the engine 36 are types of powertrain brakes.

The powertrain braking can incorporate regenerative braking, which can generate power as the electric machine 38 resists movement of the vehicle 10. The power generated by the electric machine 38 can be used to charge the traction battery 40. The powertrain braking can instead, or additionally, incorporate engine braking using resistances in the engine 36 to slow the vehicle.

The example vehicle 10 can also decelerate the vehicle 10 with the friction brakes 22. When friction braking, the at least one braking controller 26 commands the friction brakes 22 to actuate and slow the vehicle wheels 18. The friction brakes 22 can includes a brake pad or brake shoe, for example, that include wear surfaces that, when applied, resist movement of the wheels 18. Kinetic energy of moving vehicle 10 is converted into thermal energy when the friction brakes 22 are applied.

The at least one braking controller 26 could be part of an overall vehicle system controller (VSC) or could be a separate control system that communicates with the VSC. The at least one braking controller can include one or more separate control modules equipped with executable instructions for interfacing with and commanding operation of various components of the vehicle 10.

When stopping the vehicle 10 using the brake pedal 34, a driver typically begins to decelerate the vehicle 10 by lifting off the accelerator pedal 30. The driver then depresses the brake pedal 34 to bring the vehicle 10 to a complete stop.

In many prior art vehicles, depressing a brake pedal is required to bring the vehicle to a complete stop and then hold the vehicle in the stopped position. These prior art vehicles incorporate some inherent creep torque that can cause the vehicle to move if the driver is not depressing the brake pedal. In contrast to those prior art vehicles, the exemplary vehicle 10 can decelerates the vehicle 10 to bring the vehicle 10 to a stop without requiring the driver to depress the brake pedal 34.

Figure 3:
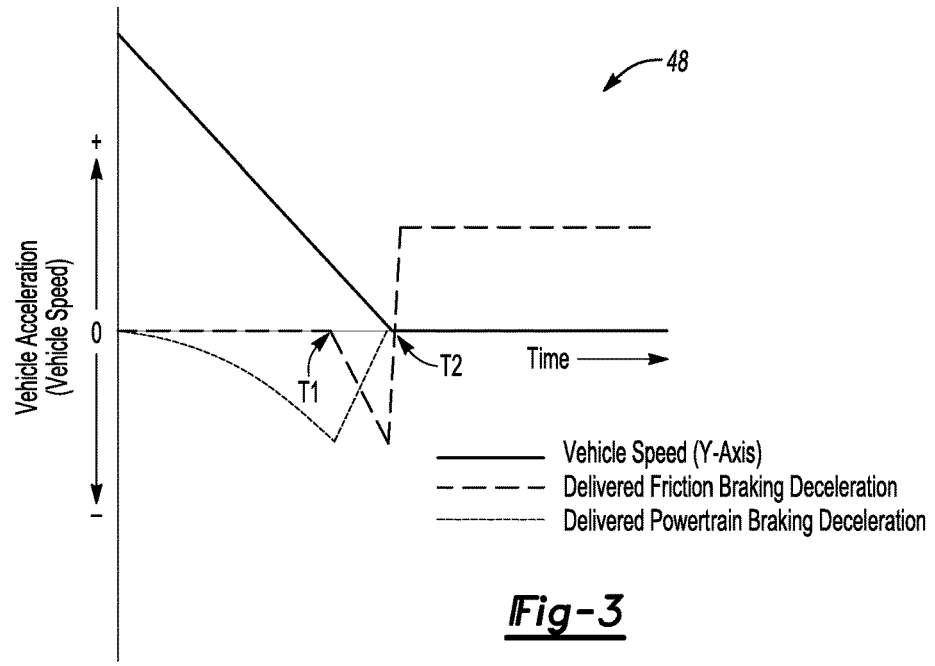
FIG. 3 illustrates a graph of powertrain braking and friction braking delivered when decelerating a vehicle to a stop.

Referring now to FIG. 3 with continuing reference to FIGS. 1 and 2, a graph 48 shows the powertrain braking and the friction braking delivered when decelerating the vehicle 10 to a stop. The powertrain braking and friction braking are delivered in response to the driver lifting off of the accelerator pedal 30 and without the driver interacting with the brake pedal 34. In response to the driver lifting off the accelerator pedal 30, the at least one braking controller 26 commands the powertrain 14 to deliver powertrain braking to slow the vehicle 10. After the vehicle 10 has decelerated in response to the power braking, the at least one braking controller 26, at time T1, commands friction braking be delivered to slow the vehicle 10.

The delivered friction braking is ramped in to the total delivered braking to bring the vehicle 10 to a complete stop at time T2. As the friction braking is ramped in to the total delivered braking, the delivered powertrain braking is ramped out. That is, as the vehicle 10 decelerates to near zero speed, the deceleration provided by friction braking is increased and the deceleration provided by powertrain braking is decreased.

In this example, the delivered powertrain braking is ramped out a first rate and the delivered friction braking is ramped in at a second rate proportional to the first rate. An absolute value of the first rate is the same as an absolute value of the second rate. The decrease in the delivered powertrain braking is thus compensated for by the increase the delivered friction braking. The first rate and the second rate are constant rates in this example.

In another example, the first rates and the second rate are nonconstant rates. In such an example, the deceleration due to powertrain braking would decrease nonlinearly at time T1, and the deceleration due to friction braking would increase nonlinearly at time T2.

The friction brakes 22 are applied even though the driver has not depressed the brake pedal 34. The friction braking by the friction brakes 22 can thus be considered autonomous friction braking.

The friction brakes 22 can be part of a brake by wire system, which actuates the friction brakes 22 in response to signals from the at least one braking controller 26 rather than directly in response to the driver pressing on the brake pedal 34. The brake by wire system is a type of autonomous braking system that allows independent autonomous and friction braking to be arbitrated with minimal disruption to the driver. Conventional non-autonomous brake systems could instead be used to deliver the braking functionality. Such convention systems may, however, experience variations in as pedal feel, vibrations, and noise.

In one specific example, decelerating the vehicle 10 to a complete stop using the powertrain braking and engine braking takes about ten seconds. The time T1 is about eight seconds and the time T2 is about ten seconds. Thus, within the braking request lasting ten seconds, the friction braking is applied for about two seconds, or about twenty-percent of the time required to bring the vehicle 10 to a complete stop.

At time T2 the vehicle 10 is at a complete stop and held in this position by the friction brakes 22 even though the driver has not depressed the brake pedal 34. The friction brakes 22 can be commanded to continue to hold the vehicle 10 at zero speed to prevent roll back (i.e., movement) of the vehicle 10. It should be noted that the sign of powertrain braking deceleration is considered negative for this illustration and the friction braking deceleration between T1 and T2 is also considered negative. When the vehicle comes to a stop, the friction deceleration required to hold the vehicle at a stop may be considered either positive or negative to counter the forces on a road grade which may be positive or negative. FIG. 3 provides an example where the road grade requires the friction deceleration to change sign at zero speed to prevent the vehicle from rolling. Even though the control deceleration sign changes, physically there is no change to the friction braking delivered. The effect of road grade is well known to those skilled in the art.

The at least one braking controller 26 is operably coupled to components of the vehicle 10. In this example, the at least one braking controller 26 is operably coupled to the powertrain 14, the wheels 18, the friction brakes 22, the accelerator pedal 30 and the brake pedal 34. The at least one braking controller 26 can be operably coupled to more or fewer components in other examples.

The example braking controller 26 includes a processor 42 operatively linked to a memory portion 44. The example processor 42 is programmed to execute a program stored in the memory portion 44. The program may be stored in the memory portion 44 as software code.

The program stored in the memory portion 44 may include one or more additional or separate programs, each of which includes an ordered list of executable instructions for implementing logical functions associated with braking the vehicle 10. The instructions enable the at least one braking controller 26 to adjust the delivery of powertrain braking and friction braking to decelerate the vehicle in response to the operator lifting off the accelerator pedal 30.

Figure 4:
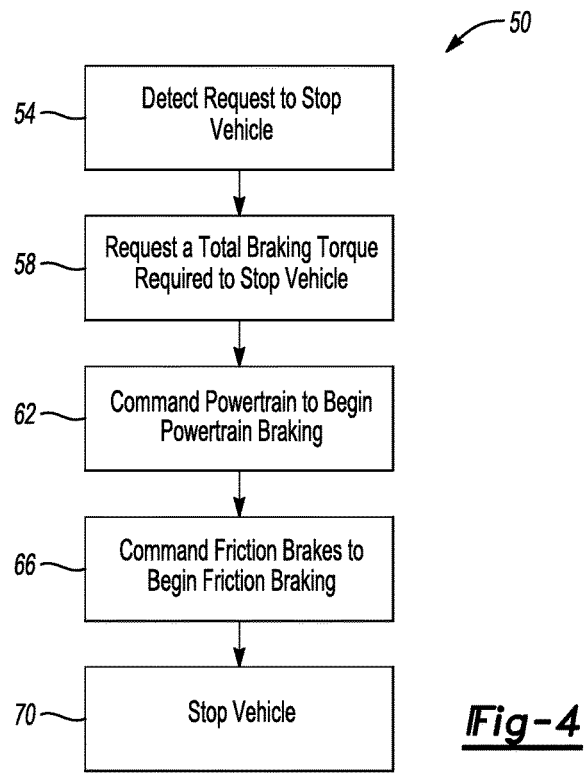
FIG. 4 illustrates an example method for stopping the vehicle of FIG. 1 in response to a driver lifting off an accelerator pedal.

Referring now to FIG. 4 with continuing reference to FIGS. 1 and 2, an example method 50 of stopping the vehicle 10 in response to a driver lifting off an accelerator pedal includes a step 54 of detecting a request to stop the vehicle. In this example, the at least one braking controller 26 interprets the driver lifting completely off of the accelerator pedal 30 as a request to stop the vehicle 10. In another example, the at least one braking controller 26 interprets the driver partially, but not completely, lifting of off the accelerator pedal 30 as a request to stop the vehicle 10.

The method 50 then moves to a step 58 where the at least one braking controller 26 determines a total braking torque requested to decelerate the vehicle 10 to a stop. The request may be based on, among other things, a speed of the vehicle 10, an accelerator pedal position, a deceleration capability of the powertrain 14, and a predetermined mapping of deceleration relative to these inputs. A person having skill in this art would understand how to configure a controller to request a total brake torque.

At a step 62, the at least one braking controller 26 commands the powertrain 14 to decelerate the vehicle 10 using powertrain braking. At a step 64, the at least one braking controller 26 commands the friction brakes 22 to decelerate the vehicle 10 using friction braking.

In some examples, the powertrain braking in the step 62 begins to decelerate the vehicle 10 in response to a braking request. The powertrain braking is then ramped out as the friction braking is ramped in to bring the vehicle 10 to a complete stop.

At a step 70, the vehicle 10 is stopped in response to the powertrain braking and the friction braking even though the driver has not interacted with the brake pedal 34. To hold the vehicle 10 in a stopped position, the at least one braking controller 26 can continue to command the friction brakes 22 to apply friction braking even though the vehicle 10 is stopped. Continuing to hold friction braking can be required to prevent the vehicle 10 from rolling, especially if the vehicle 10 is on a grade.

The method 50 can be used to decelerate and stop the vehicle 10 on level ground and, additionally, on ground with a positive or negative grade. In some examples, the method 50 is particularly appropriate for grades that do not exceed 33%. If grades do exceed 33%, stopping the vehicle 10 may require the driver of the vehicle 10 to depress the brake pedal 34.

Features of the disclosed exemplary embodiments can include avoiding lower efficiencies of an electric machine when an electrified vehicle is at or near zero speed because the controlled motor torque has been ramped down to zero.

In addition, there is substantially no loss of energy efficiency associated with holding a vehicle on a grade because the friction brakes are used to hold the vehicle stationary rather than powertrain braking. Holding a vehicle in a stopped position on a grade using powertrain braking can produce undesirable levels of thermal energy and powertrain braking would not be held indefinitely.

In some electrified vehicles, controllability of the torque from the electric machine is not an issue because, due to the powertrain braking being ramped out, the controlled torque of the electric machine when the electrified vehicle is stopped is zero. There is thus no need for a controller to rely on closed loop standstill control methodologies. Further, when a traction battery of the electrified vehicle is at or near capacity, powertrain braking with the electric machine can be difficult or its availability lessened. Under these situations, the friction braking can compensate to provide a desired deceleration to the electrified vehicle. The deceleration is provided regardless of the availability of powertrain braking.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A method, comprising: applying both friction braking and powertrain braking when decelerating a vehicle, the applying in response to a driver lifting off an accelerator pedal; and during the applying, decreasing the powertrain braking and compensating for the decreasing by increasing the friction braking.

2. The method of claim 1, wherein a magnitude of a rate of the decreasing of the powertrain braking is the same as a magnitude of a rate of the increasing of the friction braking.

3. The method of claim 1, comprising, during the applying, decreasing deceleration due to the powertrain braking at a first rate and increasing deceleration due to the friction braking at a second rate, wherein a magnitude of the second rate is proportional to a magnitude of the first rate.

4. The method of claim 1, wherein the vehicle is decelerated to a complete stop.

5. The method of claim 1, wherein the vehicle is an electrified vehicle.

6. An assembly, comprising: a powertrain brake; a friction brake; and a braking controller configured to command the powertrain brake to apply powertrain braking and the friction brake to apply friction braking to decelerate a vehicle in response to a driver lifting off an accelerator pedal, the braking controller, in response to the driver lifting off the accelerator pedal, further configured to command the powertrain braking to decrease and to command the friction braking to increase to compensate for a decrease in the powertrain braking.

7. The assembly of claim 6, wherein the powertrain brake is an internal combustion engine.

8. The assembly of claim 6, wherein the powertrain brake is an electric machine.

9. The assembly of claim 6, wherein the vehicle is an electrified vehicle.

10. The assembly of claim 6, wherein the powertrain braking and friction braking bring the vehicle to a complete stop.

11. The assembly of claim 6, wherein the controller is configured to command the powertrain braking to decrease at a first rate and to command the friction braking to increase at a second rate, wherein a magnitude of the second rate is the same as a magnitude of the first rate.

12. The assembly of claim 6, wherein the controller, in response to the driver lifting off the accelerator pedal, is configured to command powertrain braking to decrease deceleration due to powertrain braking a first rate and to command friction braking to increase deceleration due to the friction braking at a second rate, wherein a magnitude of the second rate is proportional to a magnitude of the first rate.

* * * * *

UNITED STATES PATENT AND TRADEMARK OFFICE
CERTIFICATE OF CORRECTION

| | |
|---|---|
| PATENT NO. | : 10,150,461 B2 |
| APPLICATION NO. | : 15/183135 |
| DATED | : December 11, 2018 |
| INVENTOR(S) | : Dale Scott Crombez |

It is certified that error appears in the above-identified patent and that said Letters Patent is hereby corrected as shown below:

In the Claims

In Claim 12, Column 7, Line 21; replace "braking a first rate" with --braking at a first rate--

Signed and Sealed this
Twentieth Day of September, 2022

*Katherine Kelly Vidal*

Katherine Kelly Vidal
*Director of the United States Patent and Trademark Office*